United States Patent [19]

Lewis et al.

[11] Patent Number: 5,560,645
[45] Date of Patent: Oct. 1, 1996

[54] AUTOMOTIVE AIRBAG THROAT AND MOUTH CONSTRUCTION

[75] Inventors: Trudy C. Lewis, Roy; Daniel L. Steimke, Ogden; Michael J. Daines, Brigham City, all of Utah

[73] Assignee: Morton International, Inc., Chicago, Ill.

[21] Appl. No.: 529,019

[22] Filed: Sep. 15, 1995

[51] Int. Cl.⁶ .................................................. B60R 21/16
[52] U.S. Cl. ........................... 280/728.2; 280/743.1; 280/732
[58] Field of Search ........................... 280/728.2, 743.1, 280/731, 732

[56] References Cited

U.S. PATENT DOCUMENTS

| | | | |
|---|---|---|---|
| 4,986,569 | 1/1991 | Bruton | 280/728.2 |
| 5,263,738 | 11/1993 | Oda et al. | 280/728.2 |
| 5,308,110 | 5/1994 | Kokeguchi | 280/728.2 |
| 5,344,182 | 9/1994 | Lauritzen et al. | 280/728.2 |
| 5,398,968 | 3/1995 | Emambakhsh et al. | 280/743.1 |
| 5,407,227 | 4/1995 | Lauritzen et al. | 280/728.1 |

*Primary Examiner*—Kenneth R. Rice
*Attorney, Agent, or Firm*—George W. Rauchfuss, Jr.; Gerald K. White

[57] ABSTRACT

The strain of increased airbag snap is alleviated in a throat and mouth construction of the type employing rod pockets in opposed sides of a rectangular airbag mouth. This is achieved by forming the throat material by folding and sewing so that the layers of throat material increase by steps from the single layer adjacent the bag to multiple layers forming the rod pockets.

10 Claims, 1 Drawing Sheet

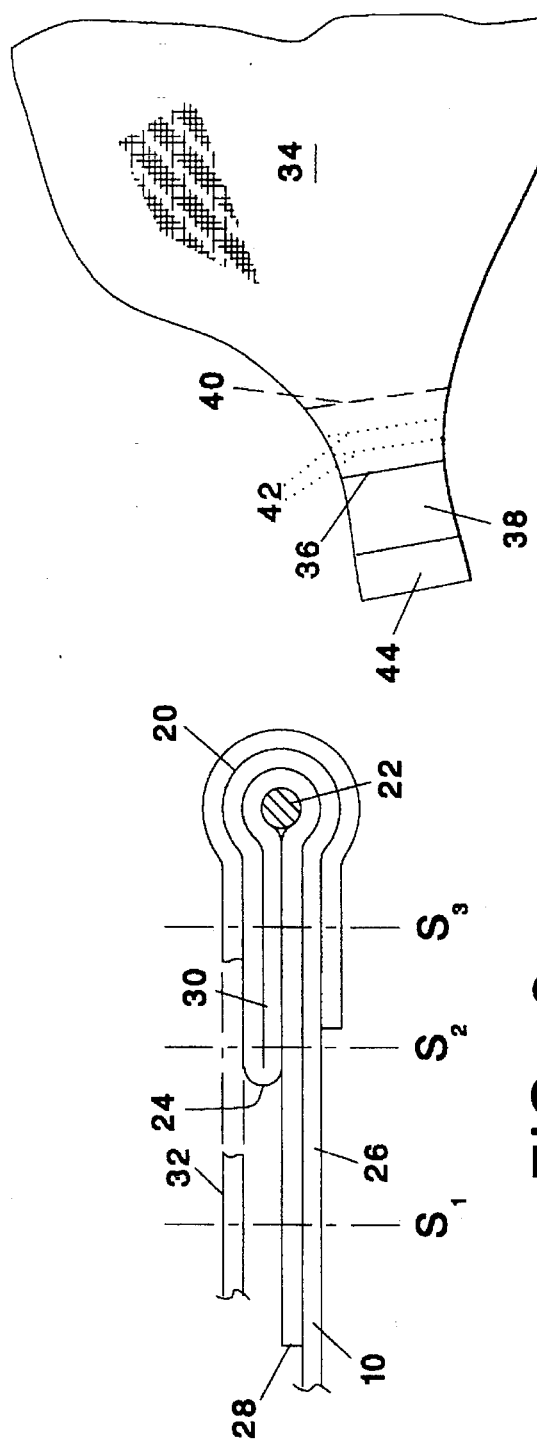
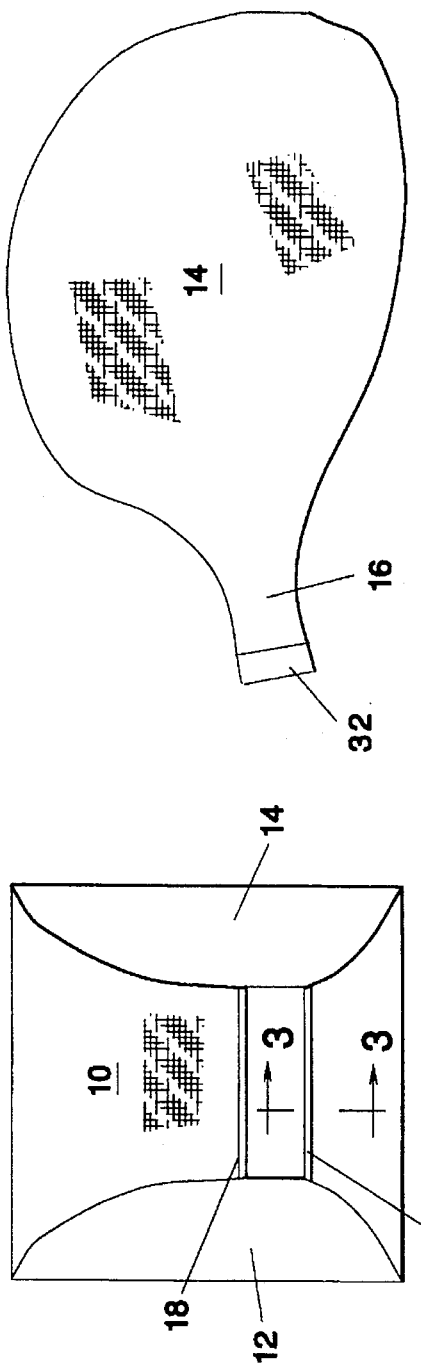
FIG. 1
FIG. 2
FIG. 3
FIG. 4

AUTOMOTIVE AIRBAG THROAT AND MOUTH CONSTRUCTION

TECHNICAL FIELD

This invention relates to the field of automotive airbags. More particularly, it relates to an improved construction of the throat and mouth portion of a passenger-side airbag.

BACKGROUND ART

Passenger-side automotive airbags are commonly constructed of an elongated, cloth or cloth-like, flexible main panel having two ends which form the opposite sides of a rectangular mouth when the panel is doubled over. Two flexible side panels of a similar material are sewn to the main panel. One end of each side panel forms a remaining side of the rectangular mouth. When inflated, the airbag is substantially square or rectangular in cross-section and tapers down to a narrow throat area adjacent the mouth.

A common way of attaching the airbag to the airbag module involves the use of pockets along opposite sides of the airbag mouth which receive rods or tubes therein. The pockets, with the rods inserted, are retained in channels formed in the module to keep the mouth open and in proximity to an inflator which supplies gas to the airbag upon occurrence of a crash.

Passenger-side airbag modules are being installed in a wide variety of vehicles, such as trucks, which have heavy duty chassis construction. Also, automobile chassis are becoming stiffer as a result of customer concerns about interior noise and vibration. Vehicles that have stiff construction are slower to crumple, and thereby dissipate energy, before the vehicle's occupants begin to move forward by inertia in response to the crash. As a result, airbags in such vehicles must inflate and deploy unusually rapidly in order to provide earlier restraint. This rapid deployment puts additional stress on all components of the airbag, in particular, the bag throat and rod pockets. The stress is most severe at bag "snap," when the bag stops its rearward movement into the vehicle and begins to fill out. Furthermore, in the case of pyrotechnic inflators, the stress occurs in a location that is subject to the weakening action of hot gases.

Accordingly, it is a primary object of the present invention to provide an airbag with a throat and mouth construction which more evenly distributes the stress of bag snap over a wide area. Another object is to provide such a construction which is cheaper than conventional construction. Another object is to provide such a construction which provides shielding against the heat of inflation gases. Other objects, features and advantages will become apparent from the following description and appended claims.

DISCLOSURE OF INVENTION

The invention comprises an improved airbag throat and mouth construction. A single layer of material is multiply folded and sewn to form a throat having a material thickness which increases from the single layer of the bag body to multiple layers around the rod pocket.

BRIEF DESCRIPTION OF DRAWINGS

FIG. 1 illustrates an inflated airbag in accordance with the invention as viewed from the mouth end;

FIG. 2 is a right elevational view of the airbag of FIG. 1;

FIG. 3 is an enlarged cross-section taken substantially along the line 3—3 of FIG. 1; and FIG. 4 is an enlarged partial view similar to FIG. 2, illustrating a modified version of the invention.

BEST MODE FOR CARRYING OUT THE INVENTION

With particular reference to FIGS. 1 and 2, the airbag of the invention comprises a main body panel 10 to which are sewn side panels 12, 14. As is shown most clearly in FIG. 2, the airbag tapers into a relatively narrow throat 16 which terminates at a rectangular mouth bounded by rod pockets 18, 20 along its two longer sides. (As used herein and in the appended claims, the term "rod" is defined as being solid or tubular and having any cross-sectional configuration.) The construction of the rod pockets is similar and, accordingly, only one is illustrated in detail in FIG. 3 which illustrates the pocket construction and its enclosed rod 22.

As illustrated in FIG. 3, the fabric layer of the main body panel 10 is first folded upon itself at a crease 24 to form a double layer hem panel 26 having an outer extremity bounded by the crease 24 and an inner extremity 28 formed by the fabric edge. The portion of the hem panel which is adjacent the crease 24 is then folded back upon itself to form a four layer cuff 30 which thereby forms the rod pocket 20. If heat shielding is desired, a layer of a suitable heat shielding material 32 may be wrapped around the pocket 20 to extend inwardly of the bag throat by any desired amount. The heat shield also acts as a stressed member of the throat. A series of stitching or sew lines $S_1$, $S_2$, $S_3$ interconnect the double layers of the hem panel and the four layers of the cuff. They also interconnect the heat shield material 32, such as neoprene, if employed. As will be clear from FIG. 3, the construction of this invention results in a graduated increase in thickness from the single layer of the main body of the airbag to a four or more layer cuff at the bag retaining rod pocket. In addition, the first sew line $S_1$ may have a relatively wider stitch spacing to better distribute the deployment loads to the additional material layers closer to the rod pocket.

FIG. 4 illustrates a modified version of the invention. In this version, the airbag 34 is constructed in essentially the same manner as that of FIGS. 1 and 2 but its narrow end 36 is connected to a separate tubular throat member 38. The throat member 38 is formed from a one-piece member which includes rod pockets (not shown) formed in the manner previously described. The end 40 of the throat member 38 extends into the interior of the airbag 34 and the throat member is secured to the bag by lines of stitching 42. Heat shield material 44 may be added as previously explained.

Because the throat member 38 is attached to the airbag 34 by continuous lines of stitching, the sewing may be readily automated. The deployment loads are evenly distributed between the main and side panels of the airbag, as opposed to prior art constructions wherein the major stress is predominantly on the main panel. Furthermore, the single rectangular piece which forms the throat member 38 results in low material cost. In a further modification of the invention, the throat member 38 may itself be made of a heat shielding material so that the addition of the separate heat shield material 44 may be omitted.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an automotive airbag having a throat formed of sheet material and terminating in a substantially rectangular mouth bounded on two parallel sides by first and second pockets for receiving mounting rods therein, the improvement which comprises:

each of said pockets being formed by said sheet material being folded back upon itself to form a double layer hem panel bounded by a crease and an inner extremity, said hem panel adjacent said crease being folded back upon itself to define the rod pocket and form a four layer cuff adjacent said rod pocket, the cuff extending part way to the inner extremity of the hem panel;

means for interconnecting the double layers of the hem panel; and means for interconnecting the four layers of the cuff.

2. The improvement of claim 1 additionally comprising:

a heat-shielding sheet encircling said rod pocket, secured to said cuff by said four layer interconnecting means, and extending from said mouth inwardly toward said airbag.

3. The improvement of claim 1 wherein each of said interconnecting means comprises at least one line of stitching.

4. The improvement of claim 2 wherein each of said interconnecting means comprises at least one line of stitching.

5. The improvement of claim 1 wherein said throat and airbag are unitary.

6. The improvement of claim 1 wherein said throat is constructed separately from said airbag and is attached thereto.

7. In an automotive airbag formed from a flexible main panel of sheet material having first and second ends, the first and second ends of said main panel forming first and second opposed sides of a substantially rectangular airbag mouth, and flexible first and second side panels secured to said main panel and forming third and fourth sides of said airbag mouth, the improvement comprising:

first and second rod pockets formed in said first and second mouth sides by a respective first or second end of said main panel being folded back upon itself to form a double layer hem panel bounded by a crease and an inner extremity, said hem panel adjacent said crease being folded back upon itself to define the rod pocket and form a four layer cuff adjacent the rod pocket, the cuff extending part way to the inner extremity of the hem panel;

means for interconnecting the double layers of the hem panel; and means for interconnecting the four layers of the cuff.

8. A throat and mouth for attachment to an airbag which comprises:

a sheet-like throat material formed into a tubular configuration having a first end for attachment to an airbag and a second end forming a substantially rectangular mouth including first and second opposed mouth sides;

a first rod pocket formed in said first mouth side by said throat material being folded back upon itself to form a double layer first hem panel bounded by a crease and an inner extremity, said first hem panel adjacent said crease being folded back upon itself to define said first rod pocket and form a four layer first cuff adjacent said first rod pocket, the cuff extending part way to the inner extremity of the hem panel;

a second rod pocket formed in said second mouth side by said throat material being folded back upon itself to form a double layer second hem panel bounded by a crease and an inner extremity, said second hem panel adjacent said crease being folded back upon itself to define said second rod pocket and form a four layer second cuff adjacent said second rod pocket, the cuff extending part way to the inner extremity of the hem panel;

means for interconnecting the double layers of the respective first and second hem panels; and means for interconnecting the four layers of the respective first and second cuffs.

9. The throat and mouth of claim 8 wherein said throat material is a heat shielding material.

10. The throat and mouth of claim 9 wherein said heat shielding material is neoprene.

* * * * *